United States Patent
Cedergren et al.

(10) Patent No.: US 9,264,081 B1
(45) Date of Patent: Feb. 16, 2016

(54) METHOD AND APPARATUS FOR INTERFERENCE CANCELLATION EFFICIENCY ESTIMATION AND CONTROL

(71) Applicant: Telefonaktiebolaget L M Ericsson (publ), Stockholm (SE)

(72) Inventors: Andreas Cedergren, Bjärred (SE); Bo Lincoln, Lund (SE); Andres Reial, Malmö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/523,236

(22) Filed: Oct. 24, 2014

(51) Int. Cl.
*H04B 1/00* (2006.01)
*H04B 15/00* (2006.01)
(Continued)

(52) U.S. Cl.
CPC .................................. *H04B 1/1027* (2013.01)

(58) Field of Classification Search
CPC ............. H04B 1/0475; H04B 1/7107; H04B 1/71072; H04B 7/0632; H04B 15/00; H04B 17/309; H04B 17/318; H04B 17/345; H04B 17/373
USPC ............ 455/63.1, 67.11, 67.13, 226.1, 226.2, 455/226.3, 295, 296; 375/346, 348
See application file for complete search history.

(56) References Cited

U.S. PATENT DOCUMENTS 5,687,189 A * 11/1997 Smith ................... H04L 1/0059
375/244
6,002,727 A * 12/1999 Uesugi ............... H04B 1/71072
455/296

(Continued)

FOREIGN PATENT DOCUMENTS

WO 2005062497 A1 7/2005
WO 2007147506 A1 12/2007
(Continued)

OTHER PUBLICATIONS

Khan, Asif A., "Interference Management for Heterogeneous Networks in 3GPP LTE Advanced and Beyond", KTH Information and Communication Technology, Master of Science Thesis, TRITA-ICT-EX-2011:232, Stockholm, Sweden, 2011, pp. 1-131.

(Continued)

*Primary Examiner* — Quochien B Vuong
(74) *Attorney, Agent, or Firm* — Murphy, Bilak & Homiller, PLLC

(57) ABSTRACT

Estimation of interference cancellation efficiency as disclosed herein advantageously accounts for the real-world or effective performance of interference cancellation by estimating the interference cancellation efficiency expected for a signal targeted for interference cancellation as a joint function of signal parameters for the targeted signal and one or more other signals that will remain after such cancellation. For example, a wireless communication apparatus, such as a user equipment configured for operation in a cellular communication network, is configured to estimate the interference cancellation efficiency expected for an interfering signal received in conjunction with a desired signal, based on a joint function of signal parameters for the interfering signal and the desired signal. Such processing extends directly, of course, to the consideration of multiple interferers and/or multiple desired signals, and may be carried out in each of two or more interference cancellation processing iterations.

18 Claims, 4 Drawing Sheets

(51) Int. Cl.
*H04B 17/00* (2015.01)
*H04B 1/10* (2006.01)

(56) References Cited

U.S. PATENT DOCUMENTS

| | | | |
|---|---|---|---|
| 6,922,434 B2 | 7/2005 | Wang et al. | |
| 7,359,689 B2 * | 4/2008 | Horisaki | H04L 25/0226 455/226.1 |
| 7,773,951 B2 | 8/2010 | Molnar et al. | |
| 7,782,987 B2 | 8/2010 | Jonsson | |
| 7,856,243 B2 | 12/2010 | Gunnarsson et al. | |
| 8,218,606 B2 | 7/2012 | Jonsson | |
| 8,224,278 B2 | 7/2012 | Cairns | |
| 8,254,325 B2 | 8/2012 | Niewczas et al. | |
| 8,340,202 B2 | 12/2012 | Huss et al. | |
| 8,369,793 B2 * | 2/2013 | Molnar | H04L 1/0007 455/277.2 |
| 8,432,874 B2 | 4/2013 | Bjorkegren | |
| 8,948,323 B2 * | 2/2015 | Cheng | H04B 7/0854 375/346 |
| 2007/0177501 A1 | 8/2007 | Papasakellariou | |
| 2007/0183544 A1 | 8/2007 | Lee et al. | |
| 2007/0275722 A1 | 11/2007 | Thorson et al. | |
| 2009/0088080 A1 | 4/2009 | Zhang et al. | |
| 2009/0088172 A1 | 4/2009 | Lusky et al. | |
| 2009/0316591 A1 | 12/2009 | Reial et al. | |
| 2010/0317355 A1 | 12/2010 | Zangi et al. | |
| 2011/0081871 A1 | 4/2011 | Molnar | |
| 2011/0103520 A1 | 5/2011 | Molnar | |
| 2011/0261872 A1 | 10/2011 | Wang et al. | |
| 2012/0027115 A1 | 2/2012 | Grant et al. | |
| 2012/0189083 A1 | 7/2012 | Reial | |
| 2013/0077578 A1 | 3/2013 | Wang et al. | |

FOREIGN PATENT DOCUMENTS

| | | |
|---|---|---|
| WO | 2009123515 A1 | 10/2009 |
| WO | 2010023100 A2 | 3/2010 |
| WO | 2012071724 A1 | 6/2012 |
| WO | 2012075387 A1 | 6/2012 |
| WO | 2013067130 A1 | 5/2013 |
| WO | 2014004897 A1 | 1/2014 |

OTHER PUBLICATIONS

Reial, Andres, "Method and Apparatus for Signal Quality Reporting for Interference-Cancellation Receivers", Unpublished U.S. Appl. No. 13/930,686, filed Jun. 28, 2013, pp. 1-52.

Unknown, Author, "Discussion on the Definition of CQI in CoMP", 3GPP TSG RAN WG1 #68, R1-120170, Samsung, Dresden, Germany, Feb. 6-10, 2012, pp. 1-2.

Unknown, Author, "Study on Network-Assisted Interference Cancellation and Suppression for LTE", 3GPP TSG RAN Meeting #59, RP-130404, Vienna, Austria, 26 Feb. 26-Mar. 1, 2013, pp. 1-7.

\* cited by examiner

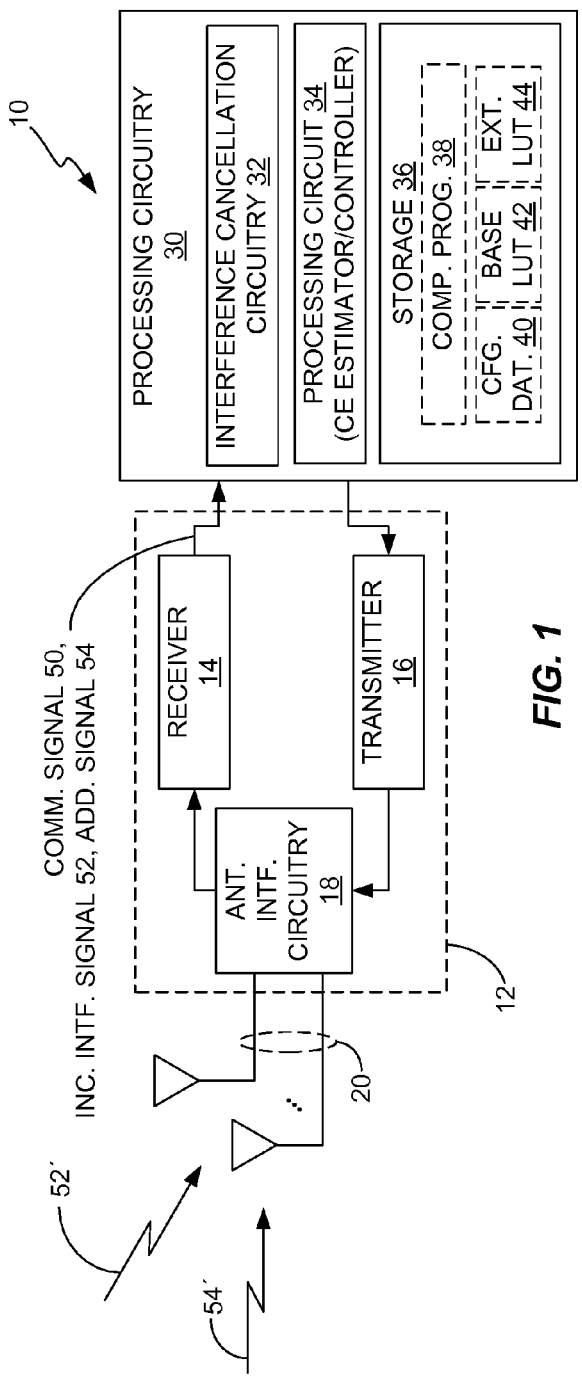
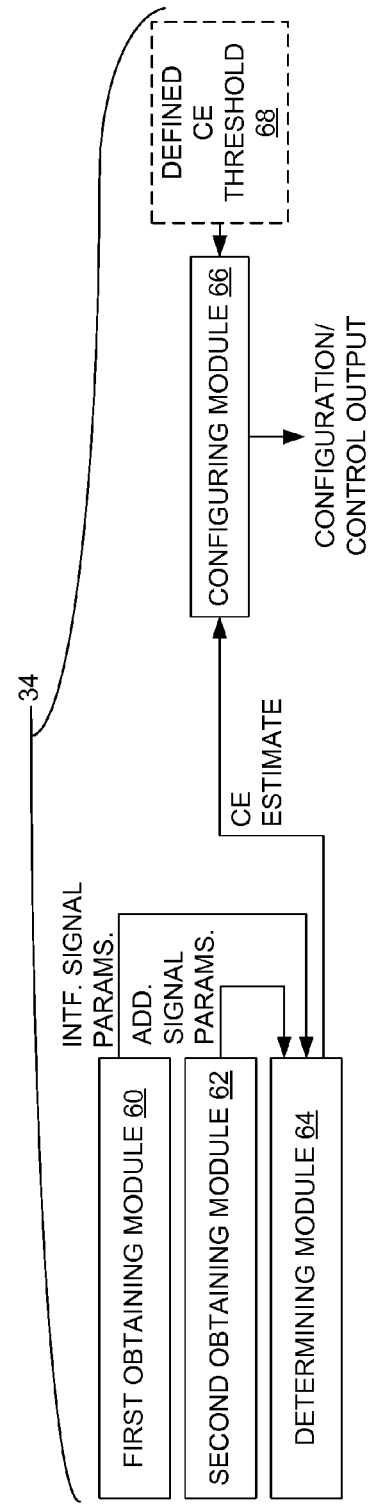
FIG. 1
FIG. 2

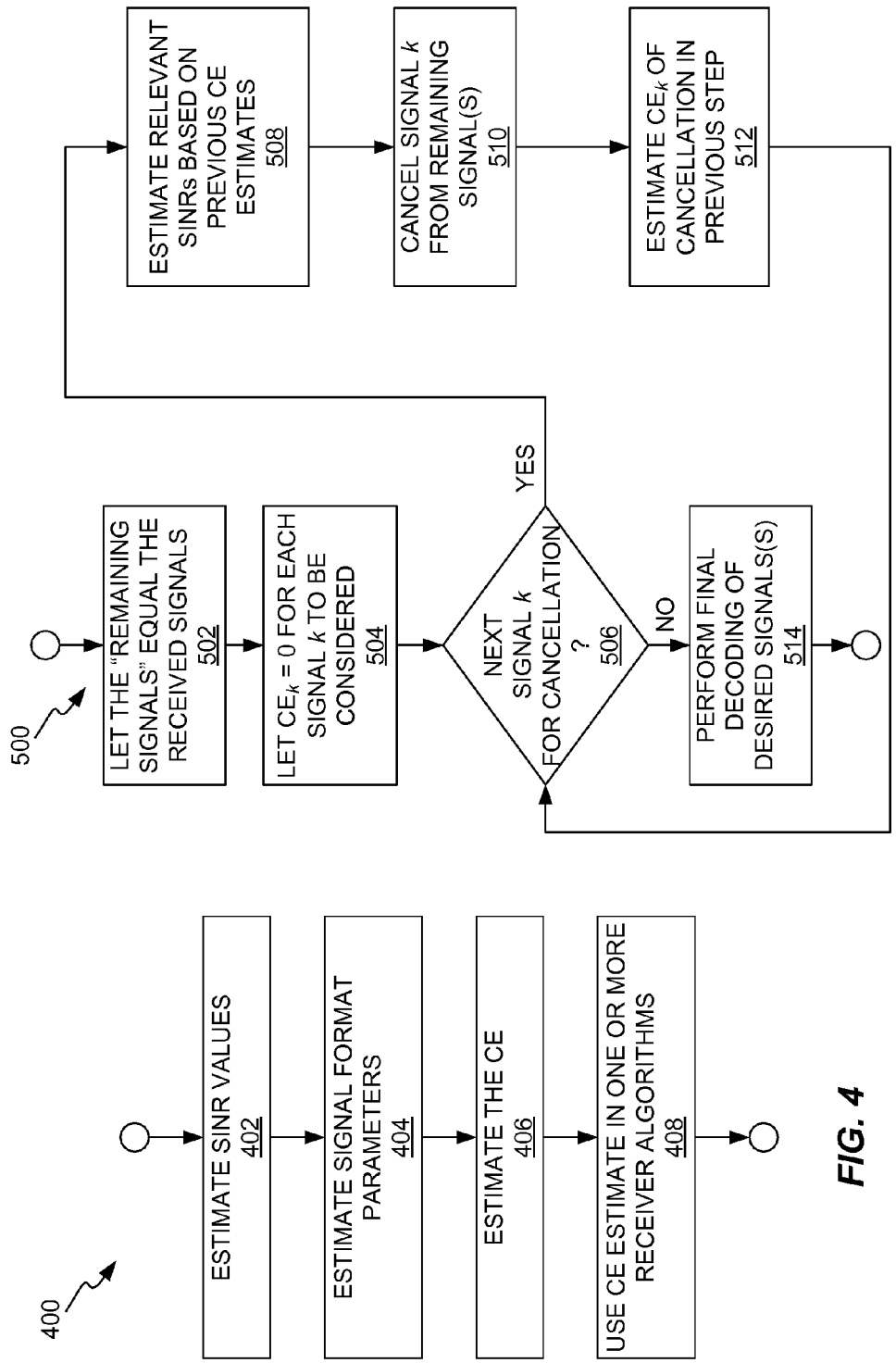

US 9,264,081 B1

METHOD AND APPARATUS FOR INTERFERENCE CANCELLATION EFFICIENCY ESTIMATION AND CONTROL

TECHNICAL FIELD

The present invention generally relates to wireless communication apparatuses, and particularly relates to the estimation of interference cancellation efficiencies in a wireless communication apparatus.

BACKGROUND

Communication receivers use interference cancellation to improve performance, such as might be measured in terms of data throughput. Interference cancellation in this respect enables successful transmission of data in instances where the transmissions likely would not be received successfully in the absence of at least some reduction in the effects of interference impinging on reception of the desired signal.

The amount or extent of interference cancellation—really, more accurately understood as interference reduction, because actual cancellation is imperfect—can be understood as a cancellation "gain". One may express cancellation gain in terms of increased throughput or in terms of the increase seen in received signal quality, such as represented by the signal-to-noise-plus-interference ratio or SINR of the demodulated symbols obtained for a desired signal component in a received signal. Here, a "desired" signal merely indicates a signal for which transmit data is recovered and it will be understood that a received wireless communication signal in general is a composite of potentially many signals of varying strengths, e.g., one or more desired signals and one or more interfering signals.

The cancellation gain depends on a number of items, including the inherent design and sophistication of the receiver and its included interference cancellation circuitry. Conventionally, the term "cancellation efficiency" or "cancellation efficiency value" is used to denote the amount of interfering signal energy removed from a desired signal after a cancellation operation. For example, a cancellation efficiency value of 0 means that no interfering energy is removed and a cancellation efficiency value of 1 means that all interfering energy from a certain interfering stream is removed. In practice, of course, no interference cancellation process has one hundred percent efficiency.

In mathematical terms, calculation of the SINR of a certain data stream is made to depend on the cancellation efficiency of interference cancellation as applied to a signal interfering with the data stream in question. This arrangement can be expressed as follows:

$$SINR_d = \frac{S_d}{N_0 + \sum_{k \neq} S_k (1 - CE_k)}$$

where $S_d$ and $S_k$ are powers of the received desired and interfering signal components, respectively, before additional processing, e.g. despreading/combining. Such measurements correspond to, for example, the OFDM input signal or the chip-level signal in DS-CDMA. Further, $N_0$ is the interference power not attributed to any signals removed using interference cancellation, d denotes the index of the data stream of interest, e.g., the desired signal, whereas k denotes the index of the signal interfering with the data stream of interest. Correspondingly, $CE_k$ denotes the cancellation efficiency for the k-th interfering signal. Note that CE is typically in range of zero to one—with zero being no cancellation and one being complete cancellation. Of course, a suboptimal design for interference cancellation processing can add more noise than is removed, resulting in a CE of less than zero.

Conventionally, the interference cancellation efficiency for a given interfering signal is estimated based on the link quality between the victim receiver and the interfering transmitter or node. Conventional processing may further consider the modulation and coding scheme or "MCS" of the interfering signal. Within this conventional framework, the cancellation efficiency is interpreted as the fraction of the interference power that is removed during the IC operation.

This simplistic approach can be embodied in a simple look-up table or "LUT" that depends only on selected parameters of the interfering signal, such as the interfering signal quality and MCS. A receiver configured to perform traditional estimation of interference cancellation efficiency would obtain or guess MCS parameters for an interfering signal and would estimate its link quality with respect to the transmitter originating the interfering signal. The conventional receiver would then use both such items of information to obtain its cancellation efficiency estimate with respect to the interfering signal. In turn, the receiver might condition certain operations on that conventional estimate. See, for example, WO 2014/004897 A1

SUMMARY

However, the above-described conventional approaches to estimating interference cancellation efficiency neglects the fact that a typical cancellation operation adds noise and/or removes desired signal energy, in addition to reducing interfering signal energy. It is recognized herein that ignoring the reductions in desired signal energy and/or increases in remaining signal noise accompanying interfering signal cancellation results in estimates that are too optimistic. In other words, the performance gains expected to follow from a given reduction in interfering signal energy are in fact not fully realized by the receiver owing to the concomitant loss in desired signal energy and/or increases in noise. More broadly, it is recognized herein that conventional approaches to cancellation efficiency estimates do not account for the dependency of real-world interference cancellation performance on the presence of other signals in conjunction with the signal being canceled.

Therefore, estimation of interference cancellation efficiency as disclosed herein advantageously accounts for the real-world or effective performance of interference cancellation by estimating the interference cancellation efficiency expected for a signal targeted for interference cancellation as a joint function of signal parameters for the targeted signal and one or more other signals that will remain after such cancellation. For example, a wireless communication apparatus, such as a user equipment configured for operation in a wireless or cellular communication network, is configured to estimate the interference cancellation efficiency expected for an interfering signal received in conjunction with a desired signal, based on a joint function of signal parameters for the interfering signal and the desired signal. Such processing extends directly, of course, to the consideration of multiple interferers and/or multiple desired signals, and may be carried out in each of two or more interference cancellation processing iterations.

In an example embodiment, a method of operation in a wireless communication apparatus includes receiving a communication signal that includes an interfering signal and a first additional signal, and further includes obtaining signal parameters for the interfering signal, including obtaining a received quality estimate for the interfering signal and a transmission format parameter for the interfering signal. Additional, the method includes obtaining one or more signal parameters for the first additional signal, including at least one of a received quality estimate, a transmission format parameter, and a received power level relative to the interfering signal. The method further includes determining a cancellation efficiency estimate for interference cancellation circuitry of the apparatus, for cancellation of the interfering signal in the presence of the first additional signal.

To account for the presence of the first additional signal, the cancellation efficiency estimate is determined as a joint function of the signal parameters obtained for the interfering signal and the first additional signal, and the method further includes configuring a receiver operation of the apparatus in dependence on the cancellation efficiency estimate. Here, it will be understood that these method steps or operations may consider one, two, or multiple additional signals, and that the "joint dependency" at issue thus involves at least one additional signal and may involve more than one additional signal. Likewise, the apparatus may configure more than one receiver operation in dependence on the cancellation efficiency estimate. In all cases, however, it should be understood that the cancellation efficiency estimate is itself dependent on the particulars of the interfering signal and on the particulars of the one or more additional signals considered.

In another embodiment, a wireless communication apparatus is configured for operation in a wireless communication network and includes a wireless communication receiver that is configured to output a received communication signal corresponding to antenna-received signals incoming to the apparatus. The received communication signal includes an interfering signal and a first additional signal. The apparatus further includes a processing circuit that is operatively associated with the receiver and configured to obtain signal parameters for the interfering signal, including obtaining a received quality estimate for the interfering signal and a transmission format parameter for the interfering signal. The processing circuit is further configured to obtain one or more signal parameters for the first additional signal, including at least one of a received quality estimate, a transmission format parameter, and a received power level relative to the interfering signal.

Further, the processing circuit is configured to determine a cancellation efficiency estimate expected for interference cancellation circuitry of the apparatus, for cancellation of the interfering signal in the presence of the first additional signal. As introduced above, the cancellation efficiency estimate is determined as joint function of the signal parameters obtained for the interfering signal and the first additional signal, and the processing circuit is further configured to configure a receiver operation of the apparatus in dependence on the cancellation efficiency estimate.

Accounting for joint dependencies as described above yields a more accurate estimate of cancellation efficiency than is obtained without joint consideration of additional signals. Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication apparatus that is configured to estimate its interference cancellation efficiency.

FIG. 2 illustrates one embodiment of functional processing implemented via the processing circuitry of a wireless communication apparatus that is configured to estimate its interference cancellation efficiency.

FIGS. 4 and 5 are logic flow diagrams illustrating example implementation details for the method introduced in FIG. 3.

DETAILED DESCRIPTION

Figure 3:
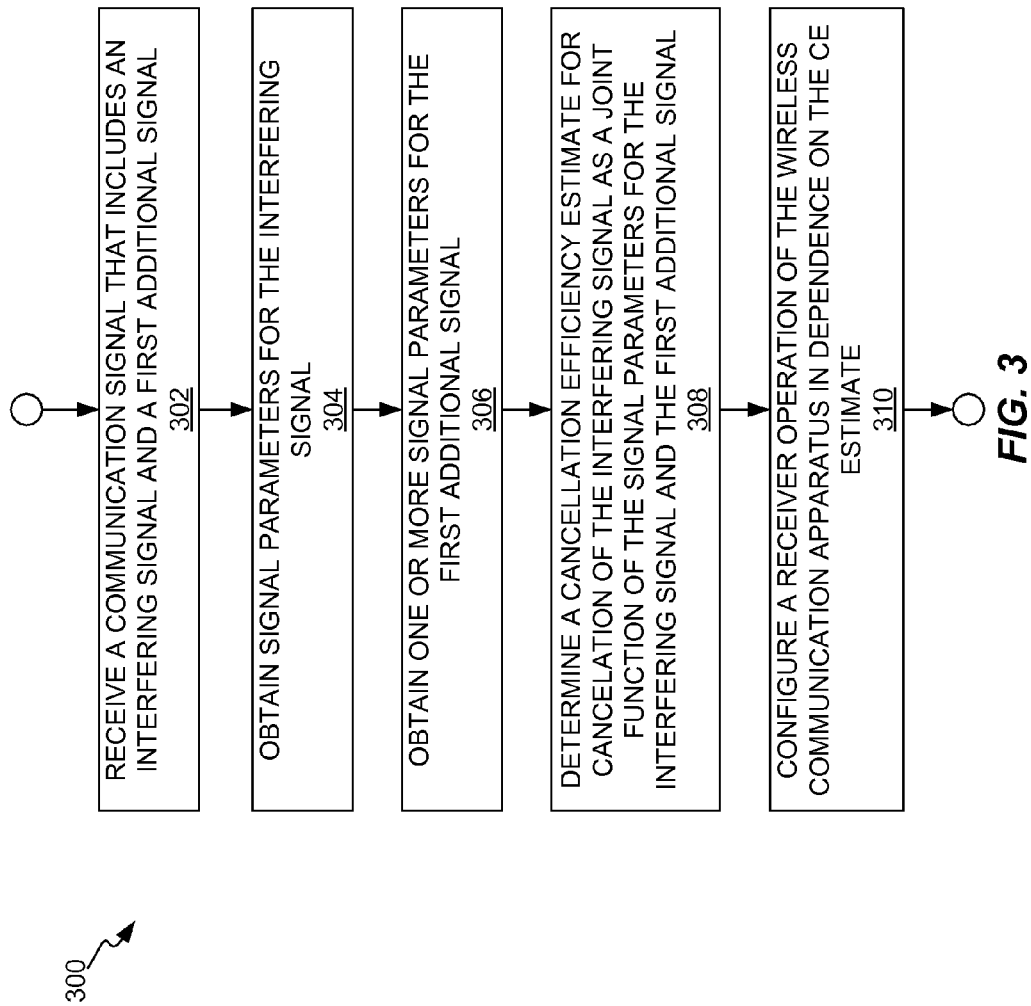
FIG. 3 is a logic flow diagram of one embodiment of a method of estimating the interference cancellation efficiency of a wireless communication apparatus.

FIG. 1 illustrates an example embodiment of a wireless communication apparatus 10, which includes a communication interface or transceiver 12. The transceiver 12 in this example embodiment includes a receiver 14, a transmitter 16 and antenna interface circuitry 18 that interfaces the receiver 14 and the transmitter 16 with one or more antennas 20.

The transceiver 12 interfaces with and operates responsive to processing circuitry 30, which at least functionally includes interference cancellation circuitry 32 and a processing circuit 34 that is configured to estimate interference cancellation efficiency according to the teachings herein, and to configure a receiver operation of the apparatus 10 in dependence on its estimates of cancellation efficiency. In at least one embodiment, the processing circuit 34 includes or is associated with storage 36, which stores any one or more of a computer program 38, configuration data 40, a "base" lookup table 42, and an "extended" lookup table 44. Hereafter, the term "lookup table" will be abbreviated as "LUT".

The storage 36 comprises a computer-readable medium and may comprise more than one type of computer-readable medium. As a non-limiting example, the storage 36 comprises one or more memory devices or circuits, and non-limiting examples include any one or more of FLASH, EEPROM, SRAM, and DRAM, and in a particular example the storage 36 includes a mix of non-volatile data and program memory and volatile working memory.

In at least one embodiment involving the computer program 38, the storage 36 provides non-transitory storage of the computer program 38 and any configuration data 40, etc., used by the processing circuit 34. Here, "non-transitory" does not necessarily mean permanent or unchanging storage and encompasses temporary storage in working memory. The term however does exclude transient, propagating signals. In such embodiments, the processing circuit 34 is configured to carry out the cancellation efficiency estimation and related configuration of the receiver operations based at least in part on the execution of computer program instructions in the computer program 38.

Correspondingly, in at least some embodiments, the processing circuit 34 comprises, one or more digital processing circuits. Non-limiting examples include one or more microprocessors, microcontrollers, Digital Signal Processors or DSPs, Field Programmable Gate Arrays of FPGAs, Complex Programmable Logic Devices or CPLDs, Application Specific Integrated Circuits or ASICs, or any mix thereof. More generally, the processing circuit 34 may comprise fixed, non-programmable circuitry, or programmable circuitry that is specially adapted via the execution of program instructions to implement the functionality taught herein, or any mix of fixed and programmed circuitry.

To better understand the interference cancellation efficiency estimation at issue, consider the further illustrated details of FIG. 1. One sees that the receiver 14 outputs a received communication signal 50, which should be understood as being a "composite" signal that at any given time may include multiple signals. For example, the communication signal 50 may include a desired signal, e.g., one targeted to the apparatus 10, but also may include any number of interfering signals and at least some of them may have significant signal strength in relation to the desired signal or signals. These multiple signals within the composite communication signal 50 may also be referred to as signal components or signal streams, which components or streams are not necessarily individually represented in the communication signal 50 and instead may be "included" in the sense that their effects are observable in the buffered signal samples representing the communication signal 50.

In general terms, the received communication signal 50 will include multiple signals at any given time, such as one or more interfering signals received in conjunction with one or more desired signals. The apparatus 10 targets one of the signals included in the received communication signal 50 for cancellation and, as taught herein, estimates the cancellation efficiency expected for cancellation of that signal in a manner that accounts for the removal of targeted signal energy, and further accounts for the effect of that removal on the remaining signal or signals. That is, the advantageous approach taught herein for estimating interference cancellation efficiency accounts for the noise added to the remaining signals as a consequence of interference cancellation and/or accounts for the incidental removal of remaining signal.

By way of non-limiting example, the communication signal 50 includes an interfering signal 52 and a first additional signal 54. The signals 52 and 54 in the communication signal 50 correspond to the antenna-received signals 52' and 54', which are incoming to the apparatus 10. In at least one embodiment, the receiver 14 comprises a receiver front-end circuit and thus provides initial filtering, amplification, down-conversion, and digitization of the incoming antenna-received signals. The receiver 14 may include individualized branches or receiver circuit "chains," with each such branch or chain providing digitized sample streams corresponding to a particular antenna and/or multipath delay, for example.

Correspondingly, then, the communication signal 50 in at least some embodiments comprises one or more digital sample streams, e.g., in-phase and quadrature sample streams from each receiver branch. The digital samples correspond to particularized spreading codes and/or particular time/frequency resources, etc., and shall generally be understood as representing received symbol samples that reflect the combined reception of at least the interfering signal 52' and the first additional signal 54'.

Here, and elsewhere in this disclosure, and in the accompanying claims, the use of "first," "second" and so on shall be understood as the use of labels for convenience. Unless otherwise stipulated, these labels do not imply any hierarchy or priority and do not imply that further signals are not also present in the communication signal 50. As such, the communication signal 50 may include any number of signals and the joint processing herein may involve the joint consideration of more than two signals at a time and/or may iteratively process any number of component signals, such a where one or more interferers are targeted in each iteration of a multi-iteration cancellation process. In one example of such processing, a given interferer is targeted for cancellation at each iteration, with the other signals intended to be remaining signals after such cancellation.

With these possibilities in mind, FIG. 1 may be broadly understood as depicting a wireless communication apparatus 10, such as one that is configured for operation in a wireless communication network—not shown. The apparatus 10 includes a wireless communication receiver 14 that is configured to output a received communication signal 50, which received communication signal 50 corresponds to antenna-received signals incoming to the apparatus 10, e.g., incoming signals 52' and 54'. The communication signal 50 thus includes an interfering signal 52 and a first additional signal 54, and it is well to note that these two signals may simply be two among a larger number of signals included in the communication signal 50.

The apparatus 10 further includes a processing circuit 34 operatively associated with the receiver 14 and configured to obtain signal parameters for the interfering signal 52, including obtaining a received quality estimate for the interfering signal 52 and a transmission format parameter for the interfering signal 52. For example, the apparatus 10 may be configured to receive assistance information from the wireless communication network, e.g., information identifying the signal parameters for the interfering signal 52 in particular and in general for any one or more signals that are known or expected to be interfering signals with respect to the apparatus 10.

Consider the case where the apparatus 10 receives a serving-cell signal, e.g., the first additional signal 54 may be a desired signal directed to the apparatus 10 from its serving base station, where reception of this desired signal is impaired by base-station transmissions originating in a nearby neighboring cell. That is, the interfering signal 52 may be an "other-cell" signal in a cellular communication network context. The apparatus 10 may be configured to report the dominant interferers it sees, and the network in turn may be configured to provide it with the above-identified signals parameters for one or more of those interferers.

Alternatively, the network might simply send signal parameter information for those base stations neighboring the current serving cell of the apparatus 10. Additionally, or as another alternative, the apparatus 10 may be configured to eavesdrop on the broadcast control channels or other signaling channels in the neighboring cells, and to obtain the needed signal parameters from the system information obtained by such eavesdropping. Still further, the apparatus 10 may be configured to blindly estimate the interfering signal parameters. Of course, the apparatus 10 may be configured to performing any one or more of these techniques and even switch between such techniques, e.g., depending on whether network assistance information is or is not available.

The processing circuit 34 is further configured to obtain one or more signal parameters for the first additional signal 54, including at least one of a received quality estimate, a transmission format parameter, and a received power level relative to the interfering signal 52. These one or more additional signal parameters may be obtained using any of the techniques described above for the interfering signal 52. However, in cases where the first additional signal 54 is targeted to the apparatus 10, the relevant signal parameters generally are known to the apparatus 10, either based on direct measurement and/or based on associated control signaling sent to it from the network.

For example, when the first additional signal 54 is a serving signal from a serving base station, the apparatus 10 receives control signaling providing the needed transmission format parameter information, which comprise Modulation and Coding Scheme, MCS, parameters. Moreover, the apparatus 10 as a general proposition is equipped to make signal quality estimates for its serving signal, based, e.g., on related pilot information received by it, and to estimate relative powers in addition to or as part of the underlying signal measurements used to determined received signal strengths and quality.

The processing circuit 34 is further configured to determine a cancellation efficiency estimate expected for interference cancellation circuitry 32 of the apparatus 10, for cancellation of the interfering signal 52 in the presence of the first additional signal 54. In particular, the processing circuit 34 is configured to determine the cancellation efficiency estimate as a joint function of the signal parameters obtained for the interfering signal 52 and the first additional signal 54. Correspondingly, the processing circuit 34 is configured to configure a receiver operation of the apparatus 10 in dependence on the cancellation efficiency estimate.

As will be seen in a number of detailed examples, the "joint function" at issue here in some embodiments is embodied in a LUT that is indexed or otherwise configured in dependence on the signal parameters obtained for the interfering signal 52 and the first additional signal 54 or, more broadly, in dependence on the signal parameters being jointly considered for a given interfering signal targeted for reduction and any number of additional signals to be remaining after such cancellation. In other example embodiments, the involved processing circuitry implements the joint function by carrying out a mathematical expression for computing the CE estimate, where the signal parameters being jointly considered serve as functional arguments or inputs for such evaluation.

Regardless, because the cancellation efficiency estimate taught herein is determined as a joint function of signal parameters of the signal targeted for cancellation and one or more of the signals that will be remaining after cancellation, it may be referred to as an "effective" cancellation efficiency estimate. Here, the word "effective" connotes the fact that the cancellation efficiency estimate accounts for the effects of interference cancellation on one or more of the other signals present with the signal to be canceled. Hereafter in this disclosure, unless a cancellation efficiency, CE, estimate is identified as being conventional or nominal, the terms "cancellation efficiency estimate" and "CE estimate" shall be understood as denoting an estimate of the effective cancellation efficiency.

In an example implementation, the processing circuit 34 is configured to compute the received signal quality for a desired signal in dependence on the CE estimate, where the desired signal is the first additional signal 54, or is a second additional signal included in the communication signal 50. Additionally, or alternatively, the processing circuit 34 is configured to decide, in dependence on the CE estimate, whether or not to perform interference cancellation with respect to the interfering signal 52. It should be appreciated that various receiver algorithms or operations may include decision points conditioned on the cancellation efficiency estimate.

FIG. 2 illustrates further example details for the processing circuit 34, which comprises, at least in functional terms, a number of processing modules or units. These functional modules are realized, for example, within computational circuitry of the processing circuit 34 based on its execution of computer program instructions included in the computer program 38. Among the illustrated modules one sees a first obtaining module 60, a second obtaining module 62, a determining module 64, and a configuring module 66.

The first obtaining module 60 obtains interfering signal parameters, e.g., for the aforementioned interfering signal 52. The obtaining module 60 obtains the interfering signal parameters by any one or more of the means detailed above—e.g., via assistance information, blind estimation, eavesdropping, etc. The second obtaining module 62 obtains the aforementioned one or more signal parameters for the first additional signal 54, as detailed above, and the determining module 64 uses the obtained parameter information to determine the CE estimate based on the joint dependencies detailed herein.

In turn, the configuring module 66 takes the CE estimate and configures one or more receiver operations in dependency on it. In one example, the configuring module 66 compares the CE estimate to a defined CE threshold. The CE threshold is, for example, a numeric value that is preconfigured or dynamically set to some value representing a CE falling between 0% cancellation and 100% cancellation. In a non-limiting example, CE estimates meeting the threshold 68 are deemed "sufficient," and CE estimates falling below the threshold 68 are deemed "insufficient." This test for "sufficiency" refers to whether or not interference cancellation processing, or use of the results obtained thereby, are worth the effort in terms of receiver resource usage, power consumption, etc.

Thus, whether or not the apparatus 10 performs interference cancellation or otherwise assumes the benefit of cancellation in its various reporting or processing operations can be conditioned on whether the CE estimate at issue has been found to be sufficient or insufficient relative to one or more defined thresholds. In an example embodiment, then, the processing circuit 34 is configured to decide whether or not to perform interference cancellation with respect to the interfering signal 52, based on comparing the CE estimate to a defined threshold 68 and deciding to perform the interference cancellation if the CE estimate exceeds the defined threshold, and otherwise deciding not to perform the interference cancellation.

In the same or another embodiment, the processing circuit 34 is configured to determine the CE estimate based on being configured to revise a nominal cancellation efficiency as a function of the signal parameters obtained for the first additional signal 54. Here, the "nominal cancellation efficiency" represents a known or expected cancellation efficiency of the apparatus 10 for the interfering signal 52 as determined without joint consideration of any additional signals that may be present in the received communication signal 50, as noted in the Background of this disclosure.

In an example implementation, the processing circuit 34 is configured to determine the nominal cancellation efficiency based solely on the signal parameters obtained for the interfering signal 52. For example, the processing circuit 34 is configured to obtain the nominal cancellation efficiency by indexing into a base LUT 42. In one example, the aforementioned received quality estimate for the interfering signal 52 comprises a SINR estimate for the interfering signal 52. Further, the aforementioned transmission format parameter for the interfering signal 52 comprises one or more modulation-and-coding-scheme, MCS, parameters for the interfering signal 52. Correspondingly, the processing circuit 34 indexes into the base LUT 42 according to SINR and MCS parameter(s) of the interfering signal 52. It shall be understood that in this arrangement, the base LUT 42 maps different values or ranges of values of SINR estimates and MCS parameters to different nominal cancellation efficiency values.

Once the nominal cancellation efficiency is determined, the processing circuit 34 uses it to derive the CE estimate disclosed herein—i.e., to derive an interference cancellation efficiency estimate that is based on joint consideration of at least the first additional signal 54 in the communication signal 50.

For example, the nominal cancellation efficiency serves as an input to a function that further considers one or more signal parameters associated with the first additional signal 54, along with like parameters for any other additional signals encompassed in the joint consideration. In another embodiment, the processing circuit 34 is configured to determine the CE estimate based on being configured to index into an extended LUT 44 using the signal parameters obtained for the interfering signal 52 and the first additional signal 54.

The extended LUT 44 may be signaled to the apparatus 10 or pre-stored in it. In any case, the extended LUT 44 is dimensioned according to the signal parameters obtained for the interfering signal 52 and the first additional signal 54, and it maps values or ranges of values for this joint set of signal parameters to corresponding CE estimates. In that sense, the extended LUT 44 can be understood as having multiple dimensions, as defined by the signal parameters, or corresponding derived values, of the interfering signal 52, and by the signal parameter or parameters, or corresponding derived values, of the first additional signal 54.

In at least some embodiments and/or at least at given times during live operation of the apparatus 10, the first additional signal 54 is one of two or more additional signals in the communication signal 50. Correspondingly, the processing circuit 34 is configured to obtain one or more signal parameters for each of the two or more additional signals, and to determine the CE estimate expected for cancellation of the interfering signal 52 based on determining the CE estimate as a joint function of the signal parameters obtained for the interfering signal 52 and the two or more additional signals, which can be denoted as 54-1, 54-2, . . . and so on.

FIG. 3 illustrates a method 300, as may be carried out by the apparatus 10. The method 300 includes receiving (Block 302) a communication signal 50 that includes an interfering signal 52 and a first additional signal 54. The method 300 further includes obtaining (Block 304) signal parameters for the interfering signal 52, including obtaining a received quality estimate for the interfering signal 52 and a transmission format parameter for the interfering signal 52, and obtaining (Block 306) one or more signal parameters for the first additional signal 54, including at least one of a received quality estimate, a transmission format parameter, and a received power level relative to the interfering signal 52. Further, the method 300 includes determining (Block 308) a CE estimate for interference cancellation circuitry 32 of the apparatus 10, for cancellation of the interfering signal 52 in the presence of the first additional signal 54.

The CE estimate is determined as a joint function of the signal parameters obtained for the interfering signal 52 and the first additional signal 54, and the method 300 further includes configuring (Block 210) a receiver operation of the apparatus 10 in dependence on the CE estimate. The term "joint function" denotes that the calculation or other such determination depends on the signal parameters obtained for the interfering signal 52 together with the one or more signal parameters obtained for the first additional signal 54. To the extent that more than one additional signal is being jointly considered with the interfering signal 52, it will be understood that the signal parameters of the interfering signal 52 targeted for cancellation will be jointly considered with the one or more signal parameters obtained for each of the additional signals included in the joint consideration.

While a user equipment or UE configured for High Speed Downlink Packet Access, HSPA, operation provides a useful example context for such processing, those of ordinary skill in the art will appreciate that the teachings herein are not limited to the HSDPA context. For example, the teachings herein apply directly to the Long Term Evolution or LTE context, which is equivalent to the number of channelization codes and the spreading factor both equaling one in the HSDPA context.

FIG. 4 introduces a method 400 which can be understood as providing example details for implementation of the method 300 introduced in FIG. 3. Broadly, the method 400 illustrates the disclosed approach to determining an improved or otherwise more realistic estimation of the CE of the interference cancellation circuitry 32, based on considering an interfering signal 52 in a received communication signal 50 jointly with one or more additional signals included in the communication signal 50, e.g., at least a first additional signal 54.

Here, the processing circuit 34 is configured to determine the CE estimate and to condition one or more receiver algorithms on the CE estimate, e.g., to decide whether or not to turn on interference cancellation or whether or not to estimate post-cancellation SINR for a desired signal in the communication signal 50. For example, if the CE estimate is below a defined efficiency threshold, the processing circuit 34 may decide to skip interference cancellation, or may decide not to factor interference cancellation gains into the SINR it reports to the network. This conditional operation is beneficial because it avoids excess the resource usage and/or battery drain associated with IC processing in cases where such processing may not provide a worthwhile return, in terms of improved reception quality for the signal of interest.

Processing "begins" with the processing circuit 34 estimating SINR values for a linear receiver for different component signals—different signals—in the received communication signal 50 (Block 402). As has been explained, the received communication signal 50 is a composite of the signals impinging on the antennas 20 at any particular time. Of course, the particular mix of signals impinging on the antennas 20 generally will change over time.

In an example, the processing circuit 34 estimates SINR for at least one interfering signal and at least one additional signal, e.g., for an interfering signal 52 and a first additional signal 54. The SINR values can be estimated from channel and covariance estimates according to known methods. The processing circuit 34 further estimates or determines the signal format parameters for the relevant component signals—i.e., the signals to be jointly considered, the at least one interfering signal 52 and one or more additional signals 54 (Block 404). Signal format parameters for the relevant component signals may be estimated blindly, obtained via network assistance signaling, or via eavesdropping the related control signaling.

Processing continues with the processing circuit 34 estimating the CE of the interference cancellation circuitry 32 with respect to the interfering signal 52 (Block 406), where such estimation is based on a joint function of the signal parameters of the interfering signal 52 and at least a first additional signal 54. The processing circuit 34 then uses the CE estimate in one or more receiver algorithms (Block 408). Here, "uses" may mean merely using the CE estimate as a decision variable, e.g., deciding whether or not to perform interference cancellation and/or whether or not to incorporate interference gain into the calculation of the signal quality reported for a desired signal.

The conventional or nominal CE estimate used in conventional receivers may be denoted herein as $A_j^{(m)}$. This nominal CE estimate characterizes the fraction of the interfering signal power that is removed in the IC operation, without joint consideration of any other signals that are present with the interfering signal. It is mathematically defined as $$A_j^{(m)} = 1 - E|\tilde{y}_j^{(m)} - y_j|^2$$

where $y_j$ and $\tilde{y}_j^{(m)}$ are the unit-power normalized true transmitted symbol and the soft-mapped cancelled symbol value in the IC receiver, respectively. The index m indicates the iteration number in case of iterative IC and the index j indicates time. In one example of iterative processing, a first interfering signal is canceled from a received communication signal to obtain a residual or remaining signal, from which a next interferer is canceled, and so on, with the final remaining signal typically being the desired signal component.

The expected value term in the above expression corresponds to the remaining interference component power after cancellation, where the interference power before cancellation is normalized to unity. The nominal CE can thus be expressed as "one minus the remaining normalized interference power". The nominal CE estimate values typically fall in the range 0 . . . 1, where the extremes correspond to no cancellation and full cancellation respectively. Typically, higher SINR, fewer codes, lower modulation format, and/or lower coding rates of a given interferer result in higher nominal CE estimates.

For practical operation in a conventional receiver, the nominal CE estimates may be pre-computed and stored in a LUT for different SINR values and different transmission formats of the interfering signal. Here, the different transmission formats may be expressed in terms of one or more MCS parameters. These interfering signal parameters are then used to index into a LUT of nominal CE estimates, for retrieval of the corresponding nominal CE estimate, $A_j^{(m)}$, for the interfering signal at time j for iteration number m, as seen below $$A_j^{(m)} = \text{LUT}_A(\text{SINR}_j^{(m-1)}, \text{MCS}_j).$$

The index m−1 indicates the previous iteration. SINR is the SINR for the interfering signal. Note that if interference cancellation is performed before decoding, then the only MCS information needed for the interfering signal is the number of codes and modulation format. For post-decoding interference cancellation, the transport block size or coding rate needs to be obtained as well for configuring of the decoder.

The nominal CE estimate can also be obtained from the interferer SINR values directly, for example, in a HSDPA context, using the heuristic model $$A_j^{(m)} \approx \frac{cg_j^{(m-1)} \cdot \text{SINR}_j^{(m-1)}}{cg_j^{(m-1)} \cdot \text{SINR}_j^{(m-1)} + c_1 \cdot M/SF},$$

where SF is the spreading factor, M is the number of HS-PDSCH channelization codes, $c_1$ is a constant that could be set to 1.0 but which also could depend on the specific receiver and modulation. Finally, cg is the coding gain.

Further, the SINR values may be measured per chip in the received HSPA signal before despreading and are the sum of all the codes used for the interfering signal—at least in the HSDPA example context. For pre-decoding interference cancellation cg=1. For post-decoding interference cancellation $cg_j^{(m-1)} \cdot S_j^{(m-1)}$ can be estimated by computing the SINR after the decoding, or the cg can be pre-computed and stored in a cg LUT, $\text{LUT}_{cg}$, for different interferer SINR values, coding rates, R, and transport block sizes, B, and then retrieved from the LUT as $$cg = \text{LUT}_{cg}(\text{SINR}, R, B).$$

For quadrature shift keying (QPSK) modulation in HSDPA, the nominal CE estimate, $A_j^{(m)}$, can be improved slightly, e.g. using the following heuristic model $$A_j^{(m)} \approx \max\left( \frac{cg_j^{(m-1)} \cdot \text{SINR}_j^{(m-1)}}{cg_j^{(m-1)} \cdot \text{SINR}_j^{(m-1)} + c_1 \cdot M/SF}, \frac{(cg_j^{(m-1)} \cdot \text{SINR}_j^{(m-1)})^2}{(cg_j^{(m-1)} \cdot \text{SINR}_j^{(m-1)})^2 + c_2 \cdot (M/SF)^2} \right)$$

where $c_2$ is constant that could be set to 1.3, for example.

The nominal CE estimate only measures how much the interfering signal power is reduced and ignores the fact that the cancellation might also add noise the remaining signal and/or remove desired signal energy. The nominal CE estimate therefore is not a complete measure of the effectiveness of the IC operation. Because the CE estimation processing taught herein accounts for the presence of other signals, it provides a more accurate determination of the "effective" cancellation efficiency.

To better appreciate the improvements, consider that without interference cancellation, any cancellable noise and interference term $N_j^{(IC)}$ appears in the denominator when computing the SINR of a received desired signal:

$$\text{SINR}_{d,j}^{(noIC)} = S_{d,j}/(N_j^{(noIC)} + N_j^{(IC)}).$$

The index noIC indicates no interference cancellation, d indicates the desired signal and j is time. The SINR expression $\text{SINR}_j^{(P)}$, for an IC receiver that could achieve perfect cancellation of the cancellable noise plus interference term after the equalizer can be modelled as, $$\text{SINR}_{d,j}^{(P)} = S_{d,j}/N_j^{(noIC)},$$

where $S_{d,j}$ is the received signal power and $N_j^{(noIC)}$ is the noise and interference term not subject to cancellation. The index P indicates perfect cancellation. The index d indicates that it is the desired signal and the index j represents time.

Of course, IC is typically not perfect and only a fraction of the $N_j^{(IC)}$ term is removed. Using the index j, the improved CE estimate at issue herein may be denoted as $CE_j^{(m)}$, which is a measure of the SINR improvement due to the interference cancellation. The mapping of SINR to $CE_j^{(m)}$ can be expressed as $$\text{SINR}_{d,j}^{(m)} = S_{d,j}/(N_j^{(noIC)} + (1 - CE_j^{(m)})N_j^{(IC)}).$$

The index m denotes the iteration number in case of iterative cancellation, such as where one interfering signal is canceled in each of two or more iterations.

The CE estimate thus describes the effective SINR of a remaining signal after cancellation of the interfering signal in question, i.e., the term $(1 - CE_j^{(m)})N_j^{(IC)}$ characterizes the residual interference contribution after IC, regardless of whether it is due to remaining interference power, reduced serving cell signal power, or additional unintentional impairment terms inserted by the IC operation. This is exactly the measure that is relevant for subsequent receiver processing.

As recognized herein, the (effective) CE estimate $CE_j^{(m)}$ depends on a large number of factors: SINR estimate for the desired and interfering signals, the transmission or signal format parameters for the same, e.g. modulation format, number of channelization codes, coding rate and coding gain, etc., and the relative power levels of the signal components being considered. These interdependencies arise because the extent of unintentionally removing fractions of other signal components besides the intended interferer during the IC operation depends on the orthogonality or cross-correlation properties of the involved signals.

For signal components with lower cross-correlation—typically more noise-like signals, e.g. HSDPA signals consisting of many high-speed physical downlink channel (HS-PDSCH) codes—the there is less inadvertent removal of the desired signal while cancelling an interferer signal. That is, where two signal components in a received signal are relatively orthogonal to start with, cancelling one of them does not result in much loss or impairment of the other signal. On the other hand, for signal components with higher cross-correlation, such as HSDPA signals consisting of one or a few HS-PDSCH codes, more of the desired signal is unintentionally removed when cancelling the interferer. Similar differences are found in the extent to which other interfering signals are unintentionally removed while cancelling a certain interferer, in case the received signal contains several interfering signals in addition to the desired signal.

Thus, for improved fidelity, it is proposed and described herein that the CE estimate for a given interfering signal should not depend only on that interferer, but must also account for the presence of signal components other than that interferer. Since the total received signal composition depends on the relative weights of the different signal components, the relative power levels of the signal components may serve as useful input information for defining the composite signal makeup for CE estimation purposes. In other words, it is advantageously recognized herein that the "cancellation error" as manifested in the signal or signals remaining after cancellation of another signal depends on how much the signals in question interfere with one another, which depends on the involved signal powers. The CE estimate proposed in one or more embodiments herein can account for such cancellation error by considering the involved signal powers.

Using SINR expressions, and assuming that the received communication signal 50 includes an interfering signal 52 and a first additional signal 54, which is a desired signal, one may express the CE estimate contemplated herein in terms of the resulting SINR improvement, using the SINR values corresponding to no IC, actual IC, and perfect IC. This approach can be expressed as $$CE_j^{(m)} = \frac{SINR_{d,j}^{(P)}\left(SINR_{d,j}^{(m)} - SINR_{d,j}^{(noIC)}\right)}{SINR_{d,j}^{(m)}\left(SINR_{d,j}^{(P)} - SINR_{d,j}^{(noIC)}\right)}.$$

This expression advantageously yields the CE estimate as an "effective" CE, because it accounts for all the above factors affecting the desired signal SINR after IC. That is, the foregoing expression accounts for the overall SINR improvement, rather than conventionally modeling CE in terms of individual components. This expression thus shall be understood as generating CE estimates that are distinguished from conventional or nominal CE estimates, which only account for the removed interfering signal energy fraction. However, the above expression may not be particularly well suited for implementation in live receiver operations because it requires SINR estimates for the desired signal both before and after IC, as well as SINR estimates corresponding to perfect interference removal.

In another implementation, and one that is well suited for implementation in the apparatus 10 for live operations, the CE estimation processing accounts for a relevant subset of parameters bearing on the effective or real-world performance of the interference cancellation circuitry 32. For example, the apparatus 10 stores an extended LUT, such as the extended LUT 44 introduced in FIG. 1. The word "extended" as used here simply means that the LUT 44 is dimensioned or otherwise configured to account for more than just the interfering signal to be canceled. For example, it is dimensioned for indexing according to signal parameters for the interferer to be canceled and signal parameters for one or more additional signals being jointly considered with the interferer.

In other words, the base LUT 42 seen in FIG. 1 may be configured as the above-described $LUT_A$, which was used to determine the nominal CE estimate, $A_j^{(m)}$. As such, the base LUT 42 is dimensioned and indexed using only the signal parameters of the interfering signal and does not provide for joint consideration of any other signals present in the signal from which the interferer is being canceled. To the extent that the apparatus 10 uses LUTs to determine the CE estimate contemplated herein, it may store one or the other of the base LUT 42 and the extended LUT 44. For example, it may store the base LUT 42 and use it to determine a nominal CE estimate, which the processing circuit 34 then uses to derive the more realistic, effective CE estimate described and claimed herein. Alternatively, the processing circuit 34 may simply store the extended LUT 44 and read from it the effective CE estimate, based on indexing into the extended LUT 44 according to the signal parameters of the interfering signal to be canceled and one or more other signals that are also present.

For example, in some embodiments, the effective CE estimate for other-cell interferer cancellation is denoted as $CE_j^{(m)}$ and is obtained using the extended LUT 44. Notably, any further interfering signal could be considered using a separate LUT or expression for that interferer, e.g. own-cell cancellation could also be considered. In more detail regarding this example, the extended LUT 44 is indexed according to three or more of the parameters from the above list of factors. In one such embodiment, the CE at issue herein could be expressed as $$CE_j^{(m)} = \text{LUT\_N}(\{par1, \ldots, parN\}),$$

where LUT_N stands in contrast to the 2-dimensional $LUT_A$ used for estimating the nominal CE described above. Note that the interfering signal SINR and signal format parameters are preferably included in the list of index parameters. The parameter list and span is receiver implementation-specific and may be determined based on prior computer simulations, considering trade-offs between the LUT size and the resulting CE approximation error. More particularly, smaller LUTs with fewer entries can result in a coarse approximation of the CE estimate, and hence have a larger approximation error than would be seen in a larger table with finer gradations.

Assuming that the first additional signal 54 is a desired signal, in one example embodiment, LUT_N may be formed using the interfering and desired signal SINR and signal format parameters, as well as their power ratios, according to the following index parameters representing interferer SINR before IC (from previous iteration), interferer signal format, desired signal SINR, desired signal format, and interferer and desired signal power relationship:

$$CE_{k,j}^{(m)} = \text{LUT\_N}\left(SINR_{k,j}^{(m-1)}, MCS_{k,j}, SINR_{d,j}^{(m-1)}, MCS_{d,j}^s, \frac{SINR_{d,j}^{(m-1)}}{SINR_{k,j}^{(m-1)}}\right).$$

The total size of the resulting 5-dimensional LUT_N may be controlled by selecting a suitable range and resolution for the different parameter spans. In at least one embodiment, the LUT_N is pre-computed off-line by simulating receiver operation. Specifically, actual CE obtained in simulation for an interfering signal is determined, according to various combinations of the applicable indexing parameters—e.g., SINR, transmission format parameters, etc., over suitable ranges. The LUT_N may thus be interpreted as providing a non-closed for solution for the CE estimate at issue herein.

Some of the index parameters have a predictable qualitative impact on the CE estimate. For example, the CE improves with increasing interferer SINR, lower MCS code rates for the interferer, and lower numbers of HS-PDSCH codes for the interferer, and vice versa. An improved CE means less desired signal removal and/or noise addition as a consequence of canceling the interferer. As another example, CE for an interferer is improved when the desired signal has more codes and/or lower SINR, and vice versa.

On the other hand, certain other parameters do not have a consistent impact on the CE, but may lead to both lower and higher CE, depending on the particular composition of the received communication signal 50. Such parameters include, for example, certain desired signal format and rate parameters.

In some cases, for example where the desired and interfering signals described in the index parameters are dominant and the power of other signal components therefore may be neglected, it may not be needed to provide the SINR and relative power information in parallel. Instead, the effective SINR for the considered signal components may be trivially computed from the relative power, and vice versa, so only one type of parameter needs to be provided. In such an example, a minimum set of parameters for joint consideration of an interfering signal 52 and a first additional signal 54 is given as {SINR, MCS}. Alternatively, the processing circuit 34 may use the parameter set {relative powers, MCS} for joint consideration with respect to the interfering signal and the first additional signal 54.

While the same parameters may be considered, the parameter set sizes will necessarily expand if more than one additional signal is considered jointly with the interfering signal 52. Further, for at least some compositions of the received communication signal 50, the parameter set jointly considered by the processing circuit 34 for an interfering signal 52 and a first additional signal 54 comprises {SINR, relative powers, MCS}. As before, this richer or more complex parameter set can, of course, be extended to cover more signal components, e.g. one or more additional interferer signals and/or desired signals.

In another embodiment, the CE estimate is using a functional closed-form expression for the CE estimate. In one such embodiment, the "effective" CE estimate, $CE_j^{(m)}$, at issue herein is calculated for an other-cell interfering signal using a closed-form function that takes the corresponding nominal CE estimate as one of its input arguments. In particular, in at least some embodiments the processing circuit 34 is configured to implement the following heuristic expression $$CE_{k,j}^{(m)} \approx A_{k,j}^{(m)} - c_3 \sqrt{A_{k,j}^{(m)}(1 - A_{k,j}^{(m)})M_k} \frac{SINR_{k,j}^{(0)}}{SINR_{k,j}^{(0)} + 1} \frac{SINR_{d,j}^{(0)}}{SINR_{d,j}^{(0)} + M_d}.$$

Here $c_3$ is constant that could be set to 1.0 as default, but could be tuned for the practical implementation of the receiver algorithms. $M_k$ is the number of HS-PDCH channelization codes for the interfering signal or other-cell signal and $M_d$ is the number of channelization codes for the desired or serving cell signal. The index "0" means the 0-th iteration, or before starting the interference cancellation, the index "k" indicates the other cell or interfering signal that is being cancelled and index "d" indicates the desired or serving cell signal. The apparent cancellation efficiency estimate may be obtained from a 2-dimensional LUT or via functional expressions, as described above. While the above formulation relates to an other-cell interferer, similar expressions can be derived and used for other types of interfering signals.

Related embodiments use other functional expressions that are devised to obtain CE estimates based on different parameters like the nominal CE estimate, an SINR estimate for the non-interference cancelled desired signal and/or additional interfering signals, the signal format for the desired signal and/or additional interfering signals, such as expressed in terms of modulation format and the number of codes, coding gain for the interfering signal, and the relative power levels of the interfering signal, the desired and one or more further additional interfering signals. In general, the functional model may thus be interpreted as providing a closed form solution for the improved CE estimate of interest herein. The CE estimates obtained in this manner are substantially equivalent to the ones that would be obtained using the extended LUT 44 discussed above. The advantage of the closed-form computation is that it eliminates the need for potentially large, multi-dimensional LUTs, but it comes at the expense of added computational burden during live operation of the apparatus 10.

Because the CE estimate determined as a joint function according to the teachings herein is a more accurate representation of the real-world or effective performance of a receiver's interference cancellation performance, receiver operations based on the CE estimate are more robust. For example, the CE estimate taught herein provides a more accurate basis for deciding whether to turn on or otherwise use its interference cancellation processing, based on comparing the CE estimate, $CE_j^{(m)}$, with a defined efficiency threshold. For example, the apparatus 10 is configured to turn on or otherwise use interference cancellation with respect to a given interferer in a given received communication signal 50 based on determining that the CE estimate determined for the interferer in joint consideration of one or more additional signals present in the received communication signal 50 is greater than a threshold T. This evaluation can be simply represented as $$CE_j^{(m)} > T,$$

where the threshold T can be set a fixed or dynamically adapted value. In at least one implementation, the threshold T is set at 0.1, which means that interference cancellation would be enabled if the CE estimate indicates an effective cancellation efficiency of greater than ten percent.

The threshold T in at least some embodiments is made to depend on, for example, the number of receive antennas of the apparatus 10, the delay spread and the SINR values of the signals within the received communication signal 50. Thus, a set or table of different threshold values could be stored in a LUT that is either pre-computed or continuously updated, based on measurements performed with interference cancellation active. In a particular example, the apparatus 10 is configured to tune the threshold T so that the processing circuit 34 enables interference cancellation when cancellation is expected to yield at least a defined increase in SINR, e.g., as measured in dB.

For example, the processing circuit 32 may determine a threshold value T that corresponds to a 0.5 dB improvement in SINR for the desired signal, and then use that threshold value to enable or disable the interference cancellation circuitry 32. In another contemplated alternative, the SINR gains for different reception scenarios are stored in a LUT accessible to the processing circuit 34. Here, the different reception scenarios are different combinations of relevant signal parameters. For example, because IC performance depends not only on the interfering signal itself, but also on the interplay between the interfering signal and the other signals that are present, the apparatus 10 may store a LUT that includes different threshold values corresponding to different parameter combinations. For example, the particular threshold value used by the apparatus 10 may change, in dependence on the particular MCS or other signal format parameters involved.

In yet another alternative embodiment, the apparatus 10 estimates the SINR for the desired signal based on its CE estimate for an interferer that is present with the desired signal, and compares it with the SINR expected for a linear receiver, to decide if interference cancellation should be turned on. For this approach, the processing circuit 34 uses a parametric model of the desired signal's impairment covariance matrix to estimate the SINR with perfect cancellation, $SINR_{d,j}^{(P)}$, where the interference term from the cancelled signal is removed. As will be understood, the covariance matrix includes row/column matrix elements representing the correlation of received signal impairments as seen across any one or more of delay paths, receiver antennas, and receiver processing branches.

With the approach immediately above, the SINR, $SINR_{d,j}^{(m)}$, expected for the desired signal after interference cancellation of the interferer under consideration can then be expressed as function of the CE estimate, the SINR of the desired signal assuming no cancellation, and the SINR of the desired signal assuming perfect cancellation:

$$SINR_{d,j}^{(m)} = SINR_{d,j}^{(noIC)} \frac{SINR_{d,j}^{(P)}}{(1 - CE_j^{(m)})(SINR_{d,j}^{(P)} - SINR_{d,j}^{(noIC)}) + SINR_{d,j}^{(noIC)}}.$$

The above equation may be used to estimate the desired-signal SINR that will obtain after interference cancellation, which SINR estimate can be used for link adaptation purposes, e.g., the computed SINR value or a corresponding channel quality indicator may be reported for use in configuring transmissions towards the apparatus 10. In an example implementation, the processing circuit 34 is configured to compute the desired-signal SINR as $$SINR_{d,j}^{(m)} = S_{d,j}/(N_j^{(noIC)} + (1 - CE_j^{(m)})N_j^{(IC)}).$$

More broadly, however, it shall be understood that the teachings herein provide an improved CE estimate that accounts for the effects of interference cancellation on one or more of the signals that would be remaining after performance of the interference cancellation. For example, as explained earlier, assume that at least two signals are present in a received communication signal, and assume that a first one of them is targeted for interference cancellation. While it is generally understood that cancellation of a first interfering signal is imperfect and that there will therefore be residual energy from the first interfering signal in the remaining signal(s), it is advantageously recognized herein that interference cancellation processing will also add noise to the remaining signal(s) and/or remove some of their energy, meaning that these remaining signals are less "good" than can be understood merely in terms of how much of the first interfering signal is removed.

Consequently, the CE estimation as taught herein advantageously accounts for these joint effects by calculating the CE estimate as a joint function of signal parameters for the signal to be canceled and one or more of the signals to be remaining after cancellation. Non-limiting example parameters considered for the signal to be canceled and the one or more signals that will remain after cancellation include: SINR, transmission format, e.g., MCS, and the relative power levels of the involved signals.

Of further note, such processing can be performed on an iterative basis, such as where more than one "round" of interference cancellation is performed and where a given one or more of the signals present in a received communication signal 50 are cancelled, or at least considered for cancellation, in each iteration. The method 500 in FIG. 5 illustrates an example embodiment of such an approach.

The method 500 can be understood as a detailed example implementation of the method 300, for an iterative interference cancellation process. In the context of FIG. 5, a list of interferers to be removed (k) is defined or initialized, e.g. based on signal strength/SINR for each among a number of interfering signals. Processing "begins" with letting the interfering signals not yet being cancelled, which are "remaining signal(s)", equal the communication signal 50 as initially received (Block 502). In other words, before any interference cancellation has been undertaken, the remaining signal set is simply the starting set of signals present in the received communication signal 50, including all interferers (k) to be canceled in this processing. Here, it shall be understood that a set of buffered data samples represents the communication signal 50.

Processing continues with initializing the CE estimate, $CE_k$, for each interfering signal k present in the communication signal 50 that is to be considered for interference cancellation, e.g., $CE_k=0$, where k≥1 (Block 504). At Block 506, the processing circuit 34 of the apparatus 10 determines whether there is a next signal k to be considered for interference cancellation. In the initial execution of this block, the "next" signal is a first one of the at least one signals k to be considered for interference cancellation.

In case of "YES" at block 506, the cancellation process of interfering signal k is started. Block 508 calculates the SINR of each stream given the $CE_k$ values from previous iterations. Block 510 will thereafter do the actual cancellation of signal k from the remaining signal(s) using soft symbols, and Block 512 updates the cancellation efficiency for signal k based on the teachings described herein.

Upon processing the last of the signals k to be considered for interference cancellation, "NO" from Block 506, processing continues with performing a final decoding of the desired signal or signals present in the then-remaining signals of the originally-received communication signal 50 (Block 514).

Figure 6:
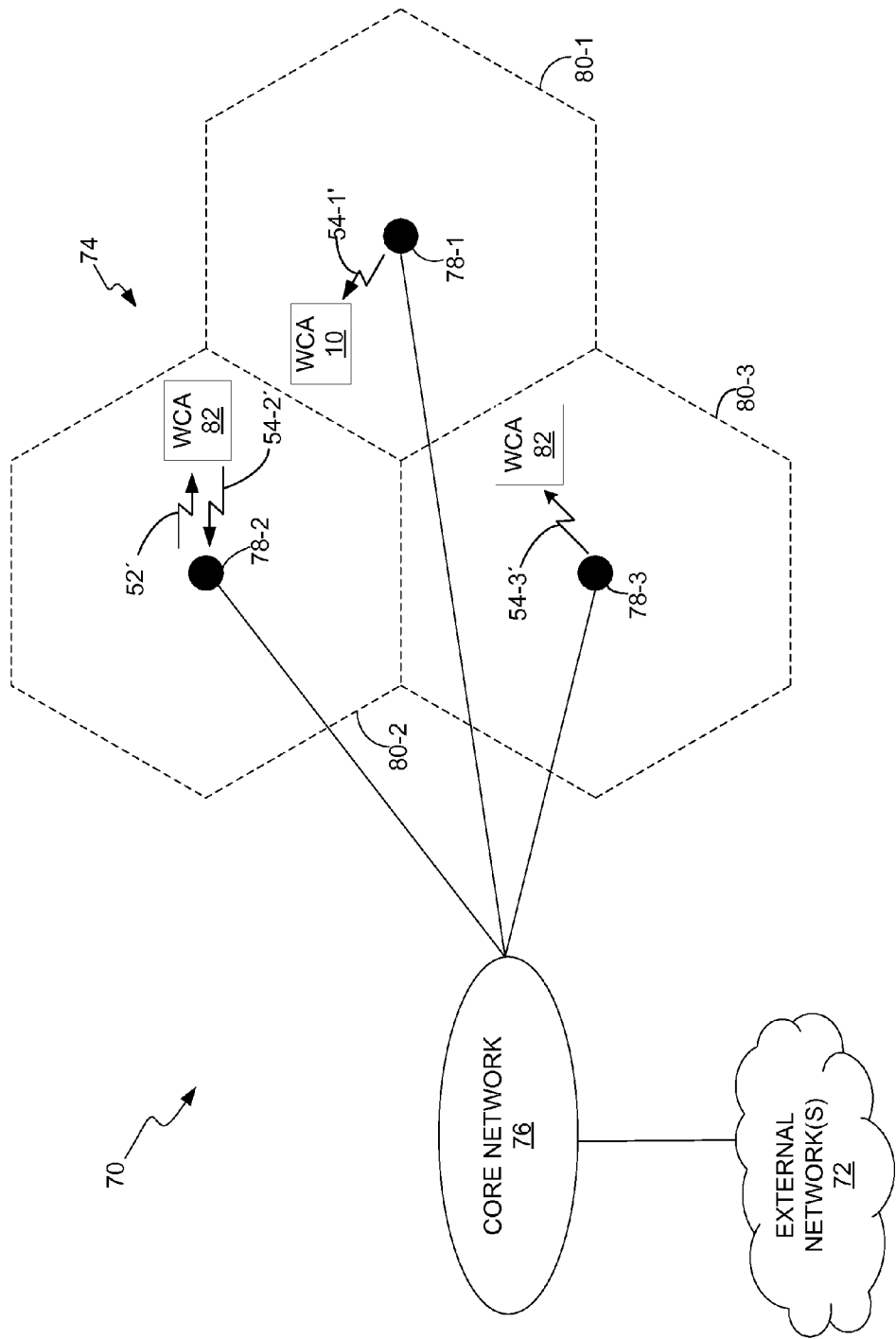
FIG. 6 illustrates one embodiment of a wireless communication network and a wireless communication apparatus configured to estimate its interference cancellation efficiency while operating in the network.

To appreciate the treatment of multiple interfering signals, consider the non-limiting example embodiment of the wireless communication network 70 shown in FIG. 6. There, one sees an embodiment of the wireless communication apparatus 10 described herein and denoted as "WCA 10" in the diagram.

The wireless communication network 70, hereafter "network 70", communicatively couples various items of user equipment, including the apparatus 10 to one or more external communication networks 72, such as the Internet. Broadly, the network 70 includes a Radio Access Network or RAN 74 and a Core Network or CN 76, the details of which are not germane to this discussion.

The RAN 74, which is depicted in simplified fashion, includes a number of radio network transceivers or base stations 78. Three base stations 78-1, 78-2 and 78-3 are shown by way of example, and it shall be understood that the reference number "78" generically refers to any one or more such base stations. Each base station 78 provides service over a corresponding service area 80, which also may be referred to as a cell 80. Merely by way of example, the base station 78-1 provides a cell 80-1, the base station 78-2 provides a cell 80-2, and the base station 78-3 provides a cell 80-3. Of course, any given base station 78 may be configured to provide more than one cell 80 and the various provided cells may have varying degrees of overlap. Notably, it should be appreciated that the teachings herein apply to a wide variety of network deployments. Thus, while FIG. 6 suggests a homogeneous network having uniform base station types and cell sizes, that depiction is non-limiting and the teachings herein apply equally to heterogeneous network deployments having non-uniform base station types, cell sizes, radio technologies, etc.

Remembering the earlier example of FIG. 1 where the apparatus 10 receives an interfering signal 52 and at least a first additional signal 54, one sees in the example of FIG. 6 an own-cell transmission of a signal 54-1' from the base station 78-1 towards the apparatus 10, along with various other-cell transmissions on the uplink and/or downlink, including signals 52', 54-2' and 54-3'. Use of the "'" here again denotes the antenna-received version of the signal component seen in the communication signal 50 as provided to the processing circuit 34 by the receiver 14 of the apparatus 10.

Thus, in this example, the processing circuit 34 receives a communication signal 50 that includes a first interfering signal 52, a first additional signal 54-1 as a desired signal, and further additional signals 54-2 and 54-3 which are desired signals with respect other wireless communication apparatuses 82 operating within the network 10, or with respect to their serving base stations 78, but which are further interfering signals with respect to the apparatus 10. The advantageous CE estimation taught herein may be applied to any one or more of the interfering signals 52, 54-2 and 54-3 and, in general to any number of signals, including any mix of interfering and desired signals.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a wireless communication apparatus configured for operation in a wireless communication network, said method comprising:
   receiving a communication signal that includes an interfering signal and a first additional signal;
   obtaining signal parameters for the interfering signal, including obtaining a received quality estimate for the interfering signal and a transmission format parameter for the interfering signal;
   obtaining one or more signal parameters for the first additional signal, including at least one of a received quality estimate, a transmission format parameter, and a received power level relative to the interfering signal;
   determining a cancellation efficiency estimate for interference cancellation circuitry of the apparatus, for cancellation of the interfering signal in the presence of the first additional signal, by determining the cancellation efficiency estimate as a joint function of the signal parameters obtained for the interfering signal and the first additional signal; and
   configuring a receiver operation of the apparatus in dependence on the cancellation efficiency estimate.

2. The method of claim 1, wherein configuring the receiver operation comprises computing, based on the cancellation efficiency estimate, a received signal quality for a desired signal included in the received communication signal as said first additional signal or as a second additional signal.

3. The method of claim 1, wherein configuring the receiver operation comprises deciding, in dependence on the cancellation efficiency estimate, whether or not to perform interference cancellation with respect to the interfering signal.

4. The method of claim 3, wherein deciding whether or not to perform interference cancellation with respect to the interfering signal comprises comparing the cancellation efficiency estimate to a defined threshold and deciding to perform the interference cancellation if the cancellation efficiency estimate exceeds the defined threshold, and otherwise deciding not to perform the interference cancellation.

5. The method of claim 1, wherein determining the cancellation efficiency estimate comprises revising a nominal cancellation efficiency as a function of the signal parameters obtained for the first additional signal, wherein the nominal cancellation efficiency represents a known or expected cancellation efficiency of the apparatus for the interfering signal without joint consideration of any additional signals that may be present in the received communication signal.

6. The method of claim 5, further comprising determining the nominal cancellation efficiency based on the signal parameters obtained for the interfering signal.

7. The method of claim 6, wherein determining the nominal cancellation efficiency comprises indexing into a base look-up table using a signal-to-noise-plus-interference, SINR, estimate for the interfering signal as said received quality estimate for the interfering signal, and using one or more modulation-and-coding-scheme, MCS, parameters for the interfering signal as said transmission format parameter for the interfering signal, wherein the base look-up table maps different values or ranges of values of SINR estimates and MCS parameters to different nominal cancellation efficiency values.

8. The method of claim 1, further comprising determining the cancellation efficiency estimate by indexing into an extended look-up table using the signal parameters obtained for the interfering signal and the first additional signal, wherein the extended look-up table is dimensioned according to the signal parameters obtained for the interfering signal and the first additional signal, and maps values or ranges of values for said signal parameters to corresponding cancellation efficiency estimate values.

9. The method of claim 1, wherein the first additional signal is one of two or more additional signals in the received communication signal, and wherein the method includes obtaining one or more signal parameters for each of the two or more additional signals, and wherein said step of determining the cancellation efficiency estimate expected for cancellation of the interfering signal comprises determining the cancellation efficiency estimate as a joint function of the signal parameters obtained for the interfering signal and the two or more additional signals.

10. A wireless communication apparatus configured for operation in a wireless communication network, said apparatus comprising:
   a wireless communication receiver configured to output a received communication signal, which received communication signal corresponds to antenna-received signals incoming to the apparatus and includes an interfering signal and a first additional signal;
   a processing circuit operatively associated with the receiver and configured to:
      obtain signal parameters for the interfering signal, including obtaining a received quality estimate for the interfering signal and a transmission format parameter for the interfering signal;
      obtain one or more signal parameters for the first additional signal, including at least one of a received quality estimate, a transmission format parameter, and a received power level relative to the interfering signal;
      determine a cancellation efficiency estimate expected for interference cancellation circuitry of the apparatus, for cancellation of the interfering signal in the presence of the first additional signal, by determining the cancellation efficiency estimate as a joint function of the signal parameters obtained for the interfering signal and the first additional signal; and
      configure a receiver operation of the apparatus in dependence on the cancellation efficiency estimate.

11. The apparatus of claim 10, wherein, as said receiver operation, the processing circuit is configured to compute the received signal quality for a desired signal in dependence on the cancellation efficiency estimate, wherein the desired signal is the first additional signal or is a second additional signal included in the communication signal.

12. The apparatus of claim 10, wherein, as said receiver operation, the processing circuit is configured to decide, in dependence on the cancellation efficiency estimate, whether or not to perform interference cancellation with respect to the interfering signal.

13. The apparatus of claim 12, wherein the processing circuit is configured to decide whether or not to perform interference cancellation with respect to the interfering signal by comparing the cancellation efficiency estimate to a defined threshold and deciding to perform the interference cancellation if the cancellation efficiency estimate exceeds the defined threshold, and otherwise deciding not to perform the interference cancellation.

14. The apparatus of claim 10, wherein the processing circuit is configured to determine the cancellation efficiency estimate based on being configured to revise a nominal cancellation efficiency as a function of the signal parameters obtained for the first additional signal, wherein the nominal cancellation efficiency represents a known or expected cancellation efficiency of the apparatus for the interfering signal without joint consideration of any additional signals that may be present in the received communication signal.

15. The apparatus of claim 14, wherein the processing circuit is configured to determine the nominal cancellation efficiency based on the signal parameters obtained for the interfering signal.

16. The apparatus of claim 15, wherein the processing circuit is configured to obtain the nominal cancellation efficiency by indexing into a base look-up table using a signal-to-noise-plus-interference, SINR, estimate for the interfering signal as said received quality estimate for the interfering signal, and using one or more modulation-and-coding-scheme, MCS, parameters for the interfering signal as said transmission format parameter for the interfering signal, wherein the base look-up table maps different values or ranges of values of SINR estimates and MCS parameters to different nominal cancellation efficiency values.

17. The apparatus of claim 10, wherein the processing circuit is configured to determine the cancellation efficiency estimate based on being configured to index into an extended look-up table using the signal parameters obtained for the interfering signal and the first additional signal, wherein the extended look-up table is stored in the apparatus and dimensioned according to the signal parameters obtained for the interfering signal and the first additional signal, and maps values or ranges of values for said signal parameters to corresponding cancellation efficiency estimate values.

18. The apparatus of claim 10, wherein the first additional signal is one of two or more additional signals in the received communication signal, and wherein the processing circuit is configured to obtain one or more signal parameters for each of the two or more additional signals, and to determine the cancellation efficiency estimate expected for cancellation of the interfering signal based on determining the cancellation efficiency estimate as a joint function of the signal parameters obtained for the interfering signal and the two or more additional signals.

* * * * *

UNITED STATES PATENT AND TRADEMARK OFFICE
CERTIFICATE OF CORRECTION

PATENT NO. : 9,264,081 B1
APPLICATION NO. : 14/523236
DATED : February 16, 2016
INVENTOR(S) : Cedergren et al.

It is certified that error appears in the above-identified patent and that said Letters Patent is hereby corrected as shown below:

On the title page,

On Page 2, item (56), under "OTHER PUBLICATIONS", in Column 2, Line 9, delete "26 Feb. 26-" and insert -- 26 Feb.- --, therefor.

In the specification,

In Column 1, Lines 54-56, delete " $SINR_d = \frac{S_d}{N_0 + \sum_{k \neq} S_k(1 - CE_k)}$ ," and insert -- $SINR_d = \frac{S_d}{N_0 + \sum_{k \neq d} S_k(1 - CE_k)}$ --, therefor.

In Column 9, Line 67, delete "HSPA," and insert -- HSDPA, --, therefor.

In Column 11, Line 58, delete "HSPA" and insert -- HSDPA --, therefor.

In Column 16, Line 56, delete "Tin" and insert -- T in --, therefor.

In Column 17, Line 1, delete "processing circuit 32" and insert -- processing circuit 34 --, therefor.

Signed and Sealed this
Seventh Day of June, 2016

Michelle K. Lee
*Director of the United States Patent and Trademark Office*